(12) United States Patent
Hönig et al.

(10) Patent No.: US 6,174,422 B1
(45) Date of Patent: Jan. 16, 2001

(54) ACID-FREE CATALYST PASTE, ITS PRODUCTION AND ITS USE IN CATHODIC ELECTRO-DIP COATING

(75) Inventors: Helmut Hönig, Komberg (AT); Gabriele Büttner, Ratingen; Klausjörg Klein, Wuppertal, both of (DE)

(73) Assignee: Herberts GmbH, Wuppertal (DE)

( * ) Notice: Under 35 U.S.C. 154(b), the term of this patent shall be extended for 0 days.

(21) Appl. No.: 09/155,440

(22) PCT Filed: Apr. 2, 1997

(86) PCT No.: PCT/EP97/01651

§ 371 Date: Oct. 2, 1998

§ 102(e) Date: Oct. 2, 1998

(87) PCT Pub. No.: WO97/38056

PCT Pub. Date: Oct. 16, 1997

(30) Foreign Application Priority Data

Apr. 5, 1996 (DE) ................................. 196 13 685

(51) Int. Cl.[7] ....................................................... C08F 2/58
(52) U.S. Cl. ........................ 204/499; 204/499; 204/489; 502/151; 502/152
(58) Field of Search ................................. 204/499, 489, 204/471; 205/440; 502/151, 152; 427/239; 106/696, 725, 727, 738

(56) References Cited

U.S. PATENT DOCUMENTS

| | | | | |
|---|---|---|---|---|
| 3,896,303 | * | 7/1975 | Gerkin | 260/78.3 |
| 4,357,255 | * | 11/1982 | Stemmler | 252/182 |
| 4,683,285 | | 7/1987 | Paar. | |
| 4,789,696 | * | 12/1988 | Paar | 523/414 |
| 4,847,346 | * | 7/1989 | Vorwerk | 528/45 |
| 4,973,392 | * | 11/1990 | Gupta | 204/181.7 |
| 5,176,804 | | 1/1993 | Buttner. | |
| 5,554,700 | | 9/1996 | Schipfer. | |
| 5,691,425 | * | 11/1997 | Klein | 525/455 |

FOREIGN PATENT DOCUMENTS

| | | |
|---|---|---|
| 2062272 | 9/1992 | (CA). |
| 44 34 593 A1 | 4/1996 | (DE). |
| 0 436 135 A1 | 7/1991 | (EP). |
| 0 469 497 A1 | 2/1992 | (EP). |
| 0 507 086 A1 | 10/1992 | (EP). |
| 0 509 437 A1 | 10/1992 | (EP). |
| WO 93/24578 | 12/1993 | (WO). |

OTHER PUBLICATIONS

Patent Abstracts of Japan, vol. 018, No. 004 (C–1149), Jan. 6, 1994 and JP 05 247385 A (Sep. 24, 1993).

* cited by examiner

Primary Examiner—Kathryn Gorgos
Assistant Examiner—J. Maisano
(74) Attorney, Agent, or Firm—Pillsbury Madison & Sutro LLP

(57) ABSTRACT

An acid-free, aqueous catalyst paste with a solids content of 30 to 70% by weight and containing dialkyltin oxide and a water-thinnable cationic binder vehicle and which can be used for cathodically depositable electro-dip lacquers, obtainable by a) dispersing dialkyltin oxide in an acid-free aqueous dispersion or solution of one or more hydroxycarboxylic acid salts of bismuth(III) in a weight ratio of tin to bismuth, calculated as the metal, from 1:3 to 3:1, and b) comminuting the preparation obtained with one or more cationic binder vehicles in a weight ratio of dialkyltin oxide plus hydroxycarboxylic acid salt of bismuth(III) to cationic binder vehicle from 0.5:1 to 6:1.

16 Claims, No Drawings

ACID-FREE CATALYST PASTE, ITS PRODUCTION AND ITS USE IN CATHODIC ELECTRO-DIP COATING

This application is the national phase of international application PCT/EP97/01651 filed Apr. 2, 1997 which designated the U.S.

FIELD OF THE INVENTION

This invention relates to acid-free catalyst pastes, to a process for producing them and to their use in processes for cathodic electro-dip coating (CEC).

BACKGROUND OF THE INVENTION

It is generally customary to employ metal catalysts for the crosslinking of CEC coating layers in order to reduce the stoving temperature. In this connection, organotin catalysts have generally been used. The use of dialkyltin oxide is desirable, and the use of dibutyltin oxide (DBTO) is particularly desirable due to its ready availability and favourable price. However, in order that it can successfully be used in CEC coatings, DBTO requires conditioning. This conditioning may consist of a separate synthesis step, i.e. in the chemical conversion of the DBTO into a dibutyltin dicarboxylate for example.

Thus CEC coating media which crosslink by means of blocked isocyanates are known from EP-A-0 509 437. These contain dialkyltin dicarboxylates derived from aromatic carboxylic acids as crosslinking catalysts, in addition to bismuth or zirconium compounds as additional catalysts. Bismuth hydroxide, trioxide, nitrate, benzoate, citrate, oxycarbonate and silicate can be used as the bismuth compounds.

DE-A-39 40 781 describes a process for producing catalyst pastes containing dibutyltin oxide by the preliminary dispersion of DBTO with organic solvent and 0.05 to 5 moles, per mole of DBTO, of an organic acid which is customary for the neutralisation of cathodically depositable electro-dip coatings, at a water content of up to 5% by weight with respect to the sum of DBTO, solvent, acid and water, and the subsequent dispersion and comminution of the mixture obtained with grinding binder vehicles and water. Preliminary dispersion is preferably effected within a temperature range from 50 to 80° C. During the production of CEC coating media, the catalyst pastes drag in organic acid. However, low acid contents are wanted in CEC coating media, since they promote good wrap-around behaviour and low current consumption during cathodic lacquer deposition.

SUMMARY OF THE INVENTION

The object of the present invention is to provide a catalyst paste containing tin which is introduced as dialkyltin oxide, particularly as DBTO. Production of the catalyst paste should be simple, and coating media produced using the catalyst paste should have a reduced content of acid which is dragged in by the paste.

It has surprisingly been shown that this object is achieved by the acid-free, aqueous catalyst paste with a solids content of 30 to 70% by weight and containing dialkyltin oxide and a water-thinnable cationic binder vehicle, to which the present invention relates, which is obtainable by
a) dispersing dialkyltin oxide in an acid-free aqueous dispersion or solution of one or more hydroxycarboxylic acid salts of bismuth(III) in a weight ratio of tin to bismuth, calculated as the metal, from 1:3 to 3:1, and
b) comminuting the preparation obtained with one or more cationic binder vehicles in a weight ratio of dialkyltin oxide plus hydroxycarboxylic acid salt of bismuth(III) to cationic binder vehicle from 0.5:1 to 6:1.

The present invention also relates to the process for producing the catalyst paste, which is characterised by the above process steps a) and b).

The process according to the invention is particularly suitable for producing catalyst pastes which contain DBTO and/or dioctyltin oxide (DOTO) as the dialkyltin oxide, for example.

The solutions used for producing the catalyst paste according to the invention, which include colloidal solutions or dispersions, are hereinafter called "aqueous preparations". Examples of aqueous preparations of hydroxycarboxylic acid salts of bismuth (III) which can be employed include those which can be produced by the reaction of bismuth(III) oxide and/or hydroxide with a hydroxycarboxylic acid in a molar ratio of 1.0 to 3.0 carboxyl groups per mole of bismuth in the presence of water. The preferred hydroxycarboxylic acids for reaction with bismuth(III) oxide and/or hydroxide are aliphatic hydroxycarboxylic acids; aliphatic hydroxymonocarboxylic acids containing 3 to 8 C atoms are particularly preferred, especially lactic acid and dimethylolpropionic acid. One or more hydroxycarboxylic acids can be used in admixture. Aqueous preparations of hydroxycarboxylic acid salts of bismuth(III) which have a bismuth content between 2 and 25% by weight, calculated as the metal, are preferably used, particularly aqueous preparations of bismuth(III) dimethylolpropionate and/or lactate which have a bismuth content between 2 and 25% by weight.

The dialkyltin oxide, e.g. DBTO, is dispersed in the presence of the aqueous preparation of the hydroxycarboxylic acid salt of bismuth(III). In this respect, the weight ratio of tin to bismuth is between 1:3 and 3:1, calculated as the metal. The dispersion operation in process step a) can additionally and preferably be effected in the presence of a partial amount of the cationic binder vehicle. If a binder vehicle containing a basic group is used as the cationic binder vehicle, the basic groups of which are neutralised by acid, it is preferable to employ the partial amount used in process step a) in un-neutralised form. For example, up to 70% by weight of the amount of binder vehicle from process step b) which is used can be used in conjunction in process step a).

Customary binder vehicles which are suitable as CEC paste resins are preferably used for this purpose as the cationic binder vehicles, which are hereinafter called "grinding resins" for the sake of simplicity. However, these may also be other binder vehicles, such as those which are used in cathodic electro-dip lacquers for the formation of coatings; these are described later as examples of binder vehicles for CEC coating media. They are for the most part characterised in that they exhibit good solubility in water and also have good wettability They are resins which contain basic groups and which are dispersible in water after neutralisation with an acid. Examples of preferred paste binder vehicles such as these are described in EP-A-0 183 025 or in EP-A-0 469 497, for example.

The dispersion operation in process step a) is effected, with or without the addition of a grinding resin, so that a suitable viscosity of the mixture is obtained, i.e. so that a free-flowing liquid material is produced which can be stirred in an agitator device such as a dissolver. A suitable viscosity can be obtained by the amount of added water.

In general, times of dispersion of 0.5 to 5 hours are sufficient, for example. During the dispersion operation, the temperature is preferably no higher than 40° C., most preferably no higher than 30° C. The lower limit is preferably 20° C., but may also be below this.

The dispersion obtained in process step a) is further dispersed and is optionally comminuted in process step b), after the addition of grinding resin, for example the residual amount of at least 30% by weight of the grinding resin, of an amount of acid sufficient to ensure water-thinnability for the grinding resin as a whole, and of water. In the course of this procedure, the acid is added, as a maximum, in the stoichiometric amount for neutralising all the neutralisable basic groups present in the grinding binder vehicle, and is preferably added as a deficit, e.g. as 40 to 95%, most preferably 40 to 80%, of the maximum stoichiometric amount. The addition of acid is not necessary if the grinding resin only contains cationic groups and no basic groups.

Organic acids such as formic acid, acetic acid, lactic acid and dimethylolpropionic acid are particularly suitable as acids for neutralising the grinding resin.

It is advantageous if the grinding resin, acid and water are added to the dispersion, with stirring, directly after the dispersion operation of process step a), without an extended holding period. For example, the grinding resin may be added first, followed by the acid and water, or a mixture of grinding resin, which is neutralised with acid, and water may be added. In particular, water is only used in deionised form.

The homogenised mixture can then be comminuted to the desired fineness of grind in a mill, e.g. a bead mill or a multiple-cage mill. The most favourable dwell time for process step b) can easily be determined by one skilled in the art in just a few tests. It depends on the rate of throughput, on the cage size, on the dissipation of temperature and on the amount and type of grinding media. A homogeneous, turbid pigment paste is produced in this process. This catalyst paste is stable during storage in the free-flowing form which is wanted.

The catalyst paste according to the invention can be used in pigment-free or in pigmented CEC coating media. If the catalyst paste is used in the production of pigmented CEC coating media, the catalyst paste is preferably pigmented in an appropriate manner so as to avoid the production of pigment pastes which are ground separately. For this purpose, the necessary pigments and/or extenders are added in process step b) as such or preferably dispersed in admixture with grinding resin, which is neutralised with acid, and water, and are jointly comminuted with the other constituents of the catalyst paste. In the course of this procedure, the proportions of grinding resin, acid and water, and of additives and solvents, may optionally be increased. The catalyst pastes according to the invention have pigment/grinding binder vehicle solids weight ratios of 0.5:1 to 6:1. For catalyst pastes which are additionally pigmented, the weight ratio of pigment plus extender to dialkyltin oxide plus hydroxycarboxylic acid salt of bismuth(III) is preferably 0.3:1 to 60:1. The term "pigment" which is used here means the sum of the dialkyltin oxide and the bismuth(III) hydroxycarboxylic acid salt and of the pigments and/or extenders which are optionally present. The solids content of the catalyst pastes according to the invention is between 30 and 70% by weight.

The usual inorganic and/or organic pigments are suitable as pigments and/or extenders. Examples include carbon black, titanium dioxide, iron oxide, kaolin, french chalk or silica, phthalocyanine pigments and quinacridone pigments, and also anti-corrosion pigments such as zinc phosphate and lead silicate.

Process steps a) and b) may be carried out at low temperatures. A temperature of 40° C. is preferably not exceeded. The lower limit is preferably about 20° C. or below.

The catalyst paste according to the invention may contain organic solvents. These may originate from the grinding binder vehicle or may be added separately in process steps a) and/or b). Examples of solvents of this type include alcohols, such as methanol, ethanol, cyclohexanol or 2-ethylhexanol for example; glycols, such as ethylene glycol, propylene glycol, diethylene glycol or dipropylene glycol for example; glycol ethers, such as methoxypropanol, ethoxypropanol, butoxyethanol or diethylene glycol diethyl ether for example; ketones, such as methyl isobutyl ketone, methyl ethyl ketone or cyclohexanone for example; or hydrocarbons. The amount of solvent is preferably 10 to 50% by weight with respect to the solids content of the catalyst paste.

The catalyst paste according to the invention may contain customary additives, such as wetting agents and antifoaming agents for example. These may be added in the customary amounts familiar to one skilled in the art during process steps a) and/or b).

A CEC coating medium can then be produced in the usual manner from the catalyst pastes according to the invention, as a single-component material in admixture with the requisite CEC binder vehicle and optionally in admixture with crosslinking agents, if necessary after neutralisation with acid, and dilution with water, or preferably as a two-component material together with a CEC binder vehicle dispersion. When the CEC coating medium is crosslinked by an external means, the CEC binder vehicle dispersion generally also contains a crosslinking agent. Electrically conductive substrates can then be coated by customary methods with the CEC coating medium and the lacquer coat can be crosslinked, e.g. by stoving.

The CEC coating media which can be produced using the catalyst pastes according to the invention are aqueous coating media with a solids content of up to 50% by weight, for example 10–30% by weight. The solids content consists of customary binder vehicles, which contain cationic substituents or substituents which can be converted into cationic groups and which optionally contain groups capable of chemical crosslinking, as well as crosslinking agents which are optionally present, and of the grinding resin, of pigments and/or extenders which are optionally present, and of DBTO, bismuth(III) hydroxycarboxylic acid salt and other additives. The cationic groups are basic groups, e.g. groups derived from amino groups by neutralisation with acid, e.g. ammonium groups or other cationic groups, e.g. quaternary ammonium groups. Examples of basic resins which can be used as binder vehicles include resins which contain primary, secondary or tertiary amino groups, and the amine number of which is 20 to 250 mg KOH/g for example. The weight average molecular weight (Mw) of the resins is preferably 300 to 10,000. Examples of resins such as these include amino(meth)acrylate resins, aminoepoxide resins, aminoepoxide resins containing terminal double bonds, aminoepoxide resins containing primary OH groups, aminopolyurethane resins, polybutadiene resins which contain amino groups, or modified epoxide resin-carbon dioxide-amine reaction products. The basic groups may exist in quaternarised form or are converted into cationic groups with a customary neutralising agent, e.g. with an organic monocarboxylic acid such as lactic acid, formic acid or acetic acid for example, as is familiar to one skilled in the art. The resins may be self-crosslinking or are used in admixture with known crosslinking agents. Examples of crosslinking agents such as these include amino plastic resins, blocked polyisocyanates, crosslinking agents containing terminal double bonds, polyepoxide compounds, crosslinking agents containing cyclic carbonate groups or crosslinking agents which contain groups capable of transesterification and/or transamidisation.

Examples of the base resins and crosslinking agents employed in cathodic electro-dip coating (CEC) baths which can be used are described in EP-A-0 082 291, EP-A-0 234 395, EP-A-0 209 857, EP-A-0 227 975, EP-A-0 178 531, EP-A-0 333 327, EP-A-0 310 971, EP-A-0 456 270, U.S. Pat. No. 3 922 253, EP-A-0 261 385, EP-A-0 245 786, EP-A-0 414 199 and EP-A-0 476 514. These resins may be used on their own or in admixture.

In addition to additives which are incorporated by way of the catalyst paste according to the invention, possible additives also include the usual additives for CEC coating media. Examples thereof include wetting agents, flow enhancers, anti-foaming agents and solvents, e.g. the additives and solvents described in connection with the catalyst pastes according to the invention.

The catalyst pastes according to the invention are simple and can be produced at low temperatures; they do not drag free acids into CEC coating media produced with them.

DETAILED DESCRIPTION OF THE PREFERRED EMBODIMENTS

EXAMPLE

Preparation of a CEC Dispersiom a) 832 parts of a monocarbonate of an epoxy resin based on bisphenol A (the commercial product Epicote 828) were mixed with 830 parts of a commercially available polycaprolactone polyol (the commercial product CAPA 205) and 712 parts of diglycol dimethyl ether, and were reacted with about 0.3% of $BF_3$ etherate at 70 to 140° C. until an epoxide number of 0 was reached. 307 parts of the reaction product of 174 parts of toluene diisocyanate (2 equivalents of NCO) with 137 parts 2-ethylhexanol with the addition of 0.3% benzyltrimethylammonium hydroxide (Triton B), which reaction product had an NCO content of about 12.8%, were added to this product (solids content 70%; 2 equivalents of carbonate) at 40 to 80° C. in the presence of 0.3% Zn acetylacetonate as a catalyst. The batch was reacted to an NCO value of about 0 and was then adjusted to about 70% solids with diglycol dimethyl ether.

b) 618 parts of the reaction product of 348 parts of toluene diisocyanate (80% 2,4-isomer, 20% 2,6-isomer) with 274 parts 2-ethylhexanol with the addition of 0.3% benzyltrimethylammonium hydroxide as a catalyst, which reaction product had a residual NCO content of about 12.8%, were slowly added to 1759 parts of a bicarbonate of an epoxy resin based on bisphenol A (the commercial product Epicote 1001®) at 60 to 80° C. The reaction was allowed to continue to an NCO value of about 0.622 parts of the reaction product of 137 parts 2-ethylhexanol with 174 parts toluene diisocyanate with catalysis by benzyltrimethylammonium hydroxide (0.3%), (NCO content about 12.8%), were added to 860 parts bishexamethylenetriamine dissolved in 2315 parts methoxypropanol at a temperature of 20 to 40° C. 4737 parts of reaction product b) and 3246 parts of reaction product a) (70% in diglycol dimethyl ether in each case) were then added and the batch reacted at 60 to 90° C. The reaction was complete at an amine number of about 32 mg KOH/g. The resulting product was subjected to distillation under vacuum, to a solids content of about 85%.

It was neutralised with 30 mmole formic acid per 100 g resin and converted into a dispersion with a solids content of about 40% by weight using deionised water.

Preparation of a Catalyst Paste a) 100.0 g of the grinding resin according to EP-A-0 469 497, Example 1 (55% by weight), 16 g of a wetting agent based on polyethylene/propylene glycol, 24.0 g of a commercially available anti-foaming agent, and 236.0 g of a 20% by weight aqueous preparation of a bismuth(III) hydroxycarboxylic acid salt (prepared from 1 mole bismuth(III) oxide and 1 mole dimethylpropionic acid) were mixed with each other in a dissolver. 50.3 g DBTO and 8.0 g silica were then added, and the mixture was dispersed at 30° C. for 1 hour after adding 41.0 g deionised water.

b) 94.5 g of the grinding resin according to EP-A-0 469 497, Example 1 (55% by weight) were neutralised with 9.9 g of 5.3 N acetic acid and diluted with 180.0 g deionised water. 3.8 g carbon black and 436.5 g titanium dioxide were added, and the mixture was dispersed.

The dispersed mixtures obtained as in a) and b) were mixed and were jointly comminuted in a bead mill at 30° C. to produce a catalyst paste with a grey pigmentation. The catalyst paste produced in this manner contained no free acid.

Production of a CEC Coating Medium

A CEC coating medium with a solids content of 20% by weight and a pigment/binder vehicle weight ratio of 0.35:1 was produced by mixing the CEC dispersion, catalyst paste and deionised water (pigment=sum of bismuth(III) hydroxycarboxylic acid salt, DBTO, silica, carbon black, titanium dioxide; binder vehicle=sum of the solids originating from the CEC dispersion and the solid grinding resin).

What is claimed is:

1. An acid-free, aqueous catalyst paste with a solids content of 30 to 70% by weight and containing dialkyltin oxide and a water-thinnable cationic binder vehicle, obtained by a) dispersing dialkyltin oxide in an acid-free aqueous dispersion or solution of one or more hydroxycarboxylic acid salts of bismuth(III) in a weight ratio of tin to bismuth, calculated as the metal, from 1:3 to 3:1, and b) comminuting the preparation obtained with one or more cationic binder vehicles in a weight ratio of dialkyltin oxide plus hydroxycarboxylic acid salt of bismuth(III) to cationic binder vehicle from 0.5:1 to 6:1.

2. A catalyst paste according to claim 1 wherein step b) is carried out in the presence of one or more pigments and/or extenders, wherein the weight ratio of the sum of pigment, extender, dialkyltin oxide and hydroxycarboxylic acid salt of bismuth(III) to cationic binder vehicle is 0.5:1 to 6:1 and the weight ratio of pigment plus extender to dialkyltin oxide plus hydroxycarboxylic acid salt of bismuth(III) is 0.3:1 to 60:1.

3. A catalyst paste according to claim 1, wherein steps a) and/or b) are carried out in the presence of organic solvents and/or of one or more customary lacquer additives.

4. A catalyst paste according to claim 1, wherein the dialkyltin oxide is dibutyltin oxide.

5. A catalyst paste according to claim 1, wherein the hydroxycarboxylic acid salt of bismuth (III) is a salt of lactic acid or of dimethyolpropionic acid.

6. A catalyst paste according to claim 1, wherein the cationic binder vehicle is a customary cationic paste resin or binder vehicle for cathodic electro-dip lacquers.

7. A process comprising using a catalyst paste according to claim 1 in cathodically depositable electro-dip lacquers.

8. A process for coating electrically conductive substrates comprising cathodic electro-dip coating, wherein an electro-dip lacquer is used which contains a catalyst paste according to claim 1.

9. A process for producing an acid-free, aqueous catalyst paste vehicle with a solids content of 30 to 70% by weight and containing dialkyltin oxide and a water-thinnable cationic binder, comprising:

a) dispersing the dialkyltin oxide in an acid-free aqueous dispersion or solution of one or more hydroxycarboxylic acid salts of bismuth (III) in a weight ratio of tin to bismuth, calculated as the metal, from 1:3 to 3:1, and b) comminuting the preparation obtained in step (a) with one or more cationic binder vehicles in a weight ratio of dialkyltin oxide plus hydroxycarboxylic acid salt of bismuth (III) to cationic binder vehicle from 0.5:1 to 6:1.

10. A process according to claim 9, comprising carrying out step b) in the presence of one or more pigments and/or extenders, wherein the weight ratio of the sum of pigment, extender, dialkyltin oxide and hydrocarboxylic acid salt of bismuth (III) to cationic binder vehicle is 0.5: to 6:1 and the weight ratio of pigment plus extender to dialkyltin oxide plus hydrocarboxylic acid salt of bismuth(III) is 0.3:1 to 60:1.

11. A process according to claim 9, comprising carrying out steps a) and/or b) in the presence of organic solvents and/or of one or more customary lacquer additives.

12. A process according to claim 9, wherein the dialkyltin oxide is dibutyltin oxide.

13. A process according to claim 9, wherein the hydroxycarboxylic acid salt of bismuth (III) is a salt of lactic acid or of dimethyolpropionic acid.

14. A process according to claim 9, wherein the cationic binder vehicle is a customary cationic paste resin or binder vehicle for cathodic electro-dip lacquers.

15. A process comprising:

using a catalyst paste produced by a process of claim 9, in cathodically depositable electro-dip lacquers.

16. A process for coating electrically conductive substrates, comprising cathodic electro-dip coating, wherein electro-dip lacquer is used which contains a catalyst paste produced by a process of claim 9.

* * * * *